(12) United States Patent
Hucker et al.

(10) Patent No.: US 8,578,769 B2
(45) Date of Patent: Nov. 12, 2013

(54) FLOW SENSORS (75) Inventors: Martyn John Hucker, Gloucestershire (GB); Graham Andrew Johnson, Bristol (GB); David Baker, Bristol (GB); Amir Rezai, Bristol (GB)

(73) Assignee: Bae Systems PLC., London (GB)

( * ) Notice: Subject to any disclaimer, the term of this patent is extended or adjusted under 35 U.S.C. 154(b) by 295 days.

(21) Appl. No.: 13/129,047

(22) PCT Filed: Nov. 12, 2009

(86) PCT No.: PCT/GB2009/051518
§ 371 (c)(1),
(2), (4) Date: May 12, 2011

(87) PCT Pub. No.: WO2010/055338
PCT Pub. Date: May 20, 2010

(65) Prior Publication Data
US 2011/0209542 A1 Sep. 1, 2011

(30) Foreign Application Priority Data
Nov. 13, 2008 (EP) .................................... 08275074
Nov. 13, 2008 (GB) .................................... 0820798.7

(51) Int. Cl.
*G01F 15/06* (2006.01)
*G01F 1/68* (2006.01)
*G01D 21/00* (2006.01)

(52) U.S. Cl.
USPC .......................... 73/273; 73/204.22; 73/866.5

(58) Field of Classification Search
USPC .................................... 73/204.22, 866.5, 273
See application file for complete search history.

(56) References Cited

U.S. PATENT DOCUMENTS

| | | | | |
|---|---|---|---|---|
| 3,424,000 A | * | 1/1969 | Bubel et al. | ................. 73/861.71 |
| 4,947,690 A | * | 8/1990 | Cleveland | ....................... 73/654 |
| 5,451,868 A | | 9/1995 | Lock | |

(Continued)

FOREIGN PATENT DOCUMENTS

EP  1 843 138 A  10/2007
WO  WO 2004/087826 A2  10/2004

OTHER PUBLICATIONS

Notification Concerning Transmittal of International Preliminary Report on Patentability (Forms PCT/IB/326 and PCT/IB/373) and the Written Opinion of the Searching Authority ( Form PCT/ISA/237) issued in the corresponding International Application No. PCT/GB2009/051518 dated May 26, 2011.
International Search Report (PCT/ISA/210) issued on Dec. 23, 2009, by Japanese Patent Office as the International Searching Authority for International Application No. PCT/GB2009/051518.

(Continued)

*Primary Examiner* — Lisa Caputo
*Assistant Examiner* — Brandi N Hopkins
(74) *Attorney, Agent, or Firm* — Buchanan Ingersoll & Rooney PC

(57) ABSTRACT

A flow sensor and fastener assembly, is disclosed which includes at least the following modules: a sensor housing and a fastener element; wherein: the sensor housing is adapted to receive a flow-based sensor, e.g. a MEMS airflow sensor; the sensor housing includes a connection for transmitting sensing signals from a fitted flow-based sensor; the fastener element includes a head and a shank, at least part of the shank being externally threaded; the fastener element includes a bore extending through the whole length of the fastener element; and the bore is shaped at the head end of the fastener element to provide a sensor housing receiving part.

16 Claims, 4 Drawing Sheets

(56) References Cited

U.S. PATENT DOCUMENTS

| | | | |
|---|---|---|---|
| 6,354,152 B1 | 3/2002 | Herlik | |
| 7,134,334 B2 * | 11/2006 | Schirmer et al. | 73/493 |
| 7,766,547 B2 | 8/2010 | Weppenaar et al. | |
| 7,901,532 B2 | 3/2011 | Bain et al. | |
| 2007/0040663 A1 | 2/2007 | Steele | |

OTHER PUBLICATIONS

Search Report issued on Jan. 6, 2009, by British Patent Office for Application No. 0820798.7.

Search Report issued on Apr. 15, 2009, by European Patent Office for Application No. 08275074.

* cited by examiner

FLOW SENSORS

FIELD OF THE INVENTION

The present invention relates to flow sensors. The present invention is particularly suited to, but not limited to, MEMS flows sensors for use in aircraft, in particular aircraft wings.

BACKGROUND

Flow sensors, e.g. MEMS flow sensors, sense the flow of air or other gas across their surface. A typical application for flow sensors is in parts, in particular the wings, of aircraft. The flow sensors are typically required to be fitted in the aircraft component such that the sensing surface of the flow sensor is flush with the surface of the aircraft component.

Quite separately, it is known to use a large number of fasteners (e.g. screw, bolts etc.) to fix component parts of aircraft and other structures to each other.

In unrelated technical fields, it is known for certain other types of sensors, that do not need to be fitted flush to a surface, to be embedded within a central region of a fastener-type item as a way of allowing the sensor to be attached to a structure. For example, U.S. Pat. No. 7,134,334 discloses a motion detector embedded in a fastener-type item for attaching to an automobile. Although in U.S. Pat. No. 7,134,334 the item is called a fastener, it does not appear that the item is intended to be used as a fastener, i.e. to fix two parts of the automobile together, rather the item is apparently intended to be used only to attach the motion detector to the automobile. Additionally, the item does not appear to be readily formed in the same dimensions or shape as conventional fasteners. Furthermore, the item is such that the motion detector is not capable of being fitted flush to a surface as is desirable for a flow sensor. US 2007/0040663 discloses another sensor item that similar comments to the above also appear to apply to.

SUMMARY OF THE INVENTION

The present inventors have realised it would be desirable to provide an assembly in which a flow sensor is integrated in a fastener, such that the sensing surface of the flow sensor can be fitted flush to a component surface using the fastener.

The present inventors have further realised it would be desirable for the assembly to be such that the fastener can be used for its fastening role, i.e. attaching two components together at the same time as fitting the flow sensor. The present inventors have realised that this would tend to provide an advantage that there was no need to add a new surface penetration (i.e. a possible defect or weak spot) to the structure by avoiding the use of a new fixing specifically for the fitting of the flow sensor.

The present inventors have further realised it would be preferable for the assembly to be such that the fastener can be used for its fastening role without structural compromise, e.g. without compromising the specified load carrying capability of the fastener, compared to a conventional fastener of the same external dimensions.

The present inventors have realised that it would be preferable for the assembly to be such that it may be provided in the same dimensions or shape as conventional fasteners used in conventional fastening mode on the structures, e.g. an aircraft wing, on which the flow sensor is to be fitted. The present inventors have realised that this would tend to provide a first advantage that in e.g. a new structure, the integrated flow sensor/fasteners can conveniently be fitted at the same time, and with common tools and procedures, as other conventional fasteners being used to fasten the structure. The present inventors have also realised that this would tend to provide a second advantage that in e.g. a structure where fasteners are already present and thereafter a flow sensor is to be installed, that one of the existing fasteners can be removed and be replaced by the integrated sensor/fastener, thereby giving a simple procedure for the fitting of the flow sensor. The present inventors have also realised that this would tend to provide a third advantage that this would reduce or remove the need for redesign of an existing structure. As mentioned earlier above, the present inventors have further realised it would be preferable for the assembly to be such that the fastener can be used for its fastening role without structural compromise, e.g. without compromising the specified load carrying capability of the fastener, compared to a conventional fastener of the same external dimensions. In the context of this paragraph that would also provide a fourth advantage of reducing or removing the need for re-design or re-certification of an existing structure to which the assembly was being fitted or retro-fitted.

The present inventors have further realised it would be desirable for the assembly to be such that the flow sensor head of the flow sensor/fastener assembly can be replaced with the flow sensor/fastener assembly in position in the structure.

In a first aspect, the present invention provides a flow sensor and fastener assembly, comprising at least the following modules: a sensor housing and a fastener element; wherein: the sensor housing is adapted to receive a flow-based sensor; the sensor housing comprises connection means for transmitting sensing signals from a fitted flow-based sensor; the fastener element comprises a head and a shank, at least part of the shank being externally threaded; the fastener element comprises a bore extending through the whole length of the fastener element; and the bore is shaped at the head end of the fastener element to provide a sensor housing receiving part.

The sensor housing may be replaceable in the fastener element.

The bore may be shaped at the other end of the fastener element to provide a keyed receiving part of the bore.

The keyed receiving part of the bore is hexagonal.

The flow sensor and fastener assembly may further comprise a flow-based sensor in the sensor housing.

The sensor housing may be replaceable in the fastener element by virtue of being push-fitted into the sensor housing receiving part.

The sensor housing may be replaceable in the fastener element by virtue of being adhered in the sensor housing receiving part by a de-bondable adhesive.

The flow sensor and fastener assembly may further comprise an insert and a retaining nut; the retaining nut being for winding onto the external thread of the fastener element for holding the insert inside the bore of the fastener element; and the insert comprising connection means for transmitting the sensing signals from the connection means of the sensor housing.

The connection means for the sensor housing may pass through and extend beyond the bore of the fastener element.

The sensor housing may be replaceable in the fastener element by virtue of the sensor housing module further comprising an extending part that is externally threaded for being screwed into the bore of the fastener element, the bore of the fastener element having a tapped surface matching the external threading of the extending part of the sensor housing module.

The flow sensor and fastener assembly may further comprise a keyed insert for fitting into the keyed receiving part of the bore of the fastener element, the keyed insert comprising connection means for transmitting the signals from the connection means of the sensor housing.

The connection means may be in the form of a coaxial arrangement.

The flow-based sensor may be a MEMS airflow sensor.

In a further aspect, the present invention provides a fastener element for a flow sensor and fastener assembly; wherein: the fastener element comprises a head and a shank, at least part of the shank being externally threaded; the fastener element comprises a bore extending through the whole length of the fastener element; and the bore is shaped at the head end of the fastener element to provide a sensor housing receiving part.

In a further aspect, the present invention provides a flow sensor and fastener assembly comprising a plurality of modules, the modules providing a modular transmission path for transmitting sensing signals from the flow sensor.

DETAILED DESCRIPTION

Figure 1:
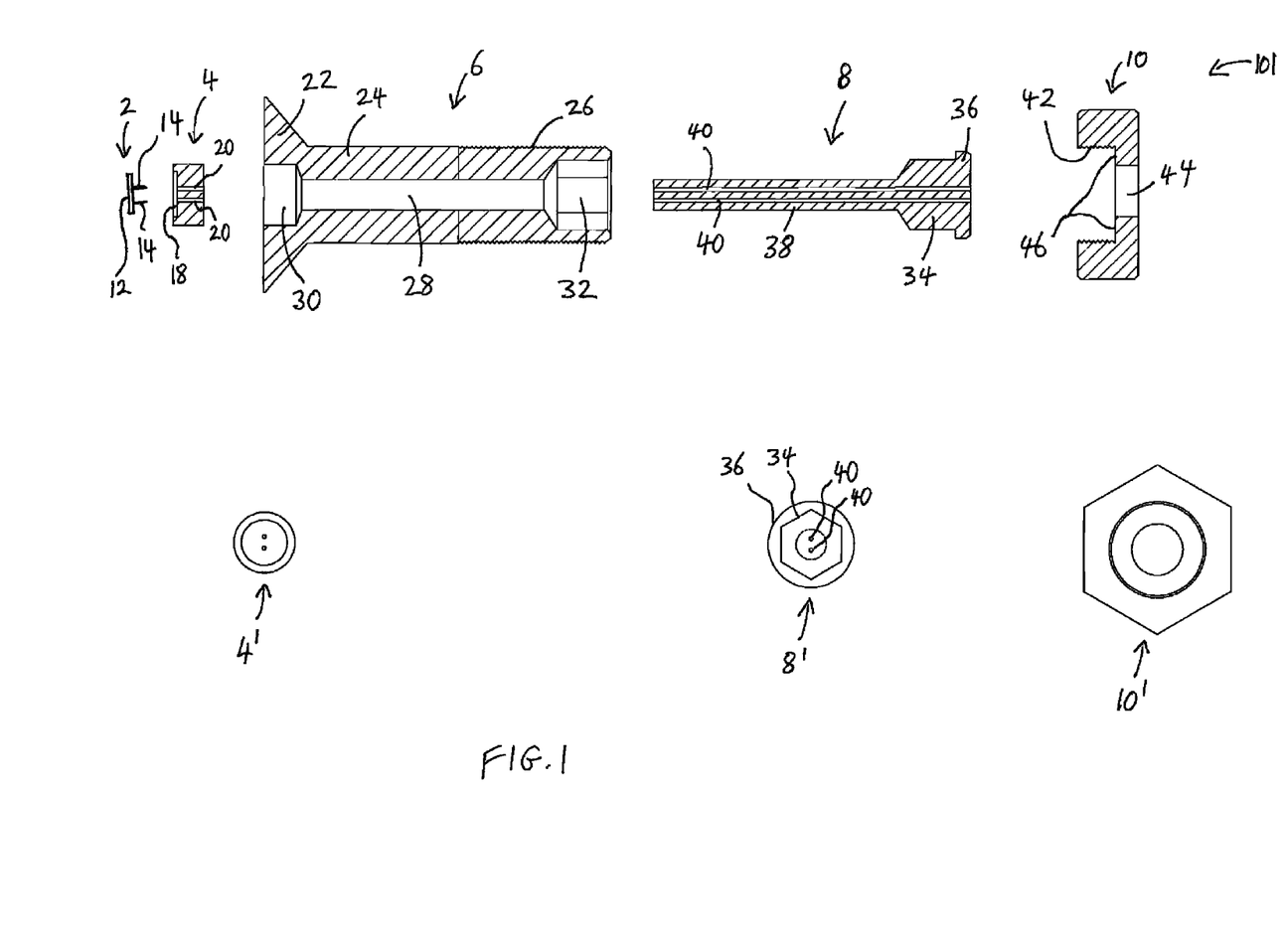
FIG. 1 is a schematic illustration of a flow sensor and fastener assembly.

FIG. 1 is a schematic illustration of a first embodiment of a flow sensor and fastener assembly 101. The flow sensor and fastener assembly 101 comprises a flow sensor 2, a sensor housing 4, a fastener element 6, a contact insert 8 and a retaining nut. In FIG. 1, for clarity these elements are shown separately, i.e. the flow sensor and fastener assembly 101 is shown in disassembled form. Also shown in FIG. 1 are an end view 4' of the sensor housing 4, an end view 8' of the contact insert 8, and an end view 10' of the retaining nut 10.

In this embodiment the flow sensor 2 is a MEMS flow sensor. The flow sensor 2 comprises a sensing surface 12 and two connection pins 14 extending from the sensing surface 12.

The sensor housing 4 is formed of a solid structure having therein a recess 18 and two connection channels 20. In this embodiment the end view 4' of the sensor housing 4 is circular shaped. The recess 18 is shaped for receiving and housing the flow sensor 2. The flow sensor 2 may be retained in the recess 18 by any appropriate method. For example the flow sensor 2 may be retained in the recess 18 by use of an adhesive, or by a push-fit.

The connection channels 16 are for receiving and providing electrical connection, for transmission of sensing signals, from the connection pins 14 of the flow sensor 2. The sensor housing 4 may be made of electrically insulating material, in which case the connection channels 16 need not be individually insulated. Alternatively, if the sensor housing 4 is made of electrically conducting material, then the connection channels 16 are individually insulated.

The fastener element 6 comprises a head 22 and a shank 24, the shank 24 including an externally threaded part 26 (another possibility is for the whole length of the shank 24 to be externally threaded). To this extent, the fastener element 6 is the same as a conventional fastener, however the following modifications are included in the fastener element 6. The fastener element 6 comprises a bore 28 hollowed out along the centre of the whole length of the fastener element 6.

The bore 28 is shaped to receive and contain the sensor housing 4 at the head 22 end of the fastener element 6 and to receive and retain the contact insert 8 at the other end of the fastener element 6.

At the head 22 end of the fastener element 6 the bore is extended in diameter to provide a sensor housing receiving part 30 of the bore 28. The sensor housing receiving part 30 of the bore 28 is sized in accordance with the size of the sensor housing 4 to receive and retain the sensor housing 4. The sensor housing 4 may be retained in the sensor housing receiving part 30 of the bore 28 by any appropriate method. For example the sensor housing 4 may be retained in the sensor housing receiving part 30 of the bore 28 by use of an adhesive, or by a push-fit. When retained by push-fit, the sensor housing 4 (and hence in effect the flow sensor 2) can be conveniently replaced even when the flow sensor and fastener assembly 101 is fitted in a structure e.g. an aircraft wing. Another possibility for enabling convenient replacement of the sensor housing 4 when the flow sensor and fastener assembly 101 is fitted in a structure is to use a so-called de-bondable adhesive. A de-bondable adhesive is an adhesive that when heated to a certain temperature is triggered into a reaction that releases the adhesive effect. Further details of such adhesives are given in WO 2004/087826, the contents of which are incorporated herein by reference.

At the other end of the fastener element 6 the bore 28 is extended in width and shaped to provide a keyed receiving part 32 of the bore 28. In this embodiment the keyed receiving part 32 of the bore 28 is hexagonal shaped. The keyed receiving part 30 of the bore 28 is sized and shaped in accordance with the size and shape of a keyed part of the contact insert 8 (which will be explained in more detail below).

The remaining central extent of the bore 28 is sized in accordance with the size of an extending part of the contact insert 8 (which will be explained in more detail below).

The contact insert 8 is formed of a solid structure comprising a keyed part 34, with a shoulder 36, and an extending part 38. In this embodiment the keyed part 34 is hexagonal shaped to fit with the keyed receiving part 32 of the bore 28 of the fastener element 6, and the extending part 38 is sized to fit with the central extent of the bore 28 of the fastener element 6. The shoulder 36 is of circular outer diameter. In FIG. 1 the end view 8' of the contact insert 8 shows the connection channels 40, the hexagonal shape of the keyed part 34, and the circular outer diameter form of the shoulder 36.

The solid structure of the contact insert 8 has therein two connection channels 40 extending the whole length of the contact insert. The connection channels are for providing electrical connection, for transmission of sensing signals, at one end to the connection channels 20 of the sensor housing 4, and at the other end to external connections to be made (not shown). The contact insert 8 may be made of electrically insulating material, in which case the connection channels 40 need not be individually insulated. Alternatively, if the contact insert 8 is made of electrically conducting material, then the connection channels 40 are individually insulated.

One function of the contact insert 8 is to act as a transmission conduit for the sensor signals, by virtue of the connection channels, as described above.

Another possible function of the contact insert 8, and in particular the keyed part 34, is to align the orientation of the connection channels 40 of the contact insert 8 to the connection channels 20 of the sensor housing 4. In order to further facilitate this alignment, the sensor housing can be adapted, e.g. by providing an alignment mark on its surface, or by providing a one-fit only shape to the flow sensor 2 and the recess 18 of the sensor housing 4.

Another possible function of the contact insert 8 is to provide a capability for the flow sensor and fastener assembly 101 to be gripped during installation, thereby allowing the head 22 of the fastener element 6 to have a smooth surface and also allowing benefits of underside gripping and installation to be achieved. This function is achieved in part by the keyed shape (here hexagonal) of the above described respective matching keyed parts of the fastener element 6 and contact insert 8 which therefore allow the fastener element to be held fixed in a rotational sense by gripping and fixing in a rotational sense the keyed part 34 of the contact insert 8 when the retaining nut 10 (which will be described in more detail below) is screwed around the externally threaded part 26 of the shank 24 of the fastener element 6.

Another possible function of the contact insert 8 is to provide additional mechanical strength to the flow sensor and fastener assembly 101, in effect at least partially replacing any lost strength due to the presence of the bore 28, hence contributing to the capability of the flow sensor and fastener assembly 101 to function as a normal fastener for fixing two structures together as well as providing a way to fit the sensor. The contact insert 8 may be made of stronger material than a conventional fastener. Preferably the assembly is strengthened by the contact insert 8 such that the fastener can be used for its fastening role without structural compromise, e.g. without compromising the specified load carrying capability of the fastener, compared to a conventional fastener of the same external dimensions; this may tend to provide an advantage of reducing or removing the need for re-design or re-certification of an existing structure to which the assembly was being fitted or retro-fitted.

The retaining nut 10 has a tapped inner surface 42 around a central hole 44, with the inner diameter of the tapped part of the retaining nut, and the tapped thread itself, matching the threaded part 26 of the fastener element 6, in the same manner as conventional retaining nuts. However, the retaining nut additionally is shaped to provide a ledge 46 that in effect reduces the diameter of the central hole 44. The ledge 46 is for butting up against the shoulder 36 of the contact insert 8 to retain the contact insert in the bore 28 when the retaining nut is screwed around the threaded part 26 of the fastener element 26 during installation of the flow sensor and fastener assembly 101.

In this embodiment, as shown in FIG. 1 by the end view 10' of the retaining nut 10, the retaining nut 10 is a hexagonal retaining nut, and the inner extent of the tapered inner surface 42, the inner shape of the ledge 46, and the central hole 44 are all circular shaped.

The central hole 44 allows access to the contact insert during and after installation for the external electrical connections (not shown) to the connection channels 40 of the contact insert 8, thereby completing electrical connection for transmission of sensing signals from the flow sensor 2.

Preferably, in order to allow alignment of the sensor with the direction of airflow during fitting, an alignment mark or other such feature may be included.

For completeness it is noted that thereby, in this embodiment, a modular transmission path is provided for the sensing signals, the modular transmission path comprising the connection pins 14 of the flow sensor 2, the connection channels 20 of the sensor housing and the connection channels 40 of the contact insert. The ends of some or all of the connection channels may be provided with female sockets or male pin extensions or the like to facilitate contact.

Figure 2:
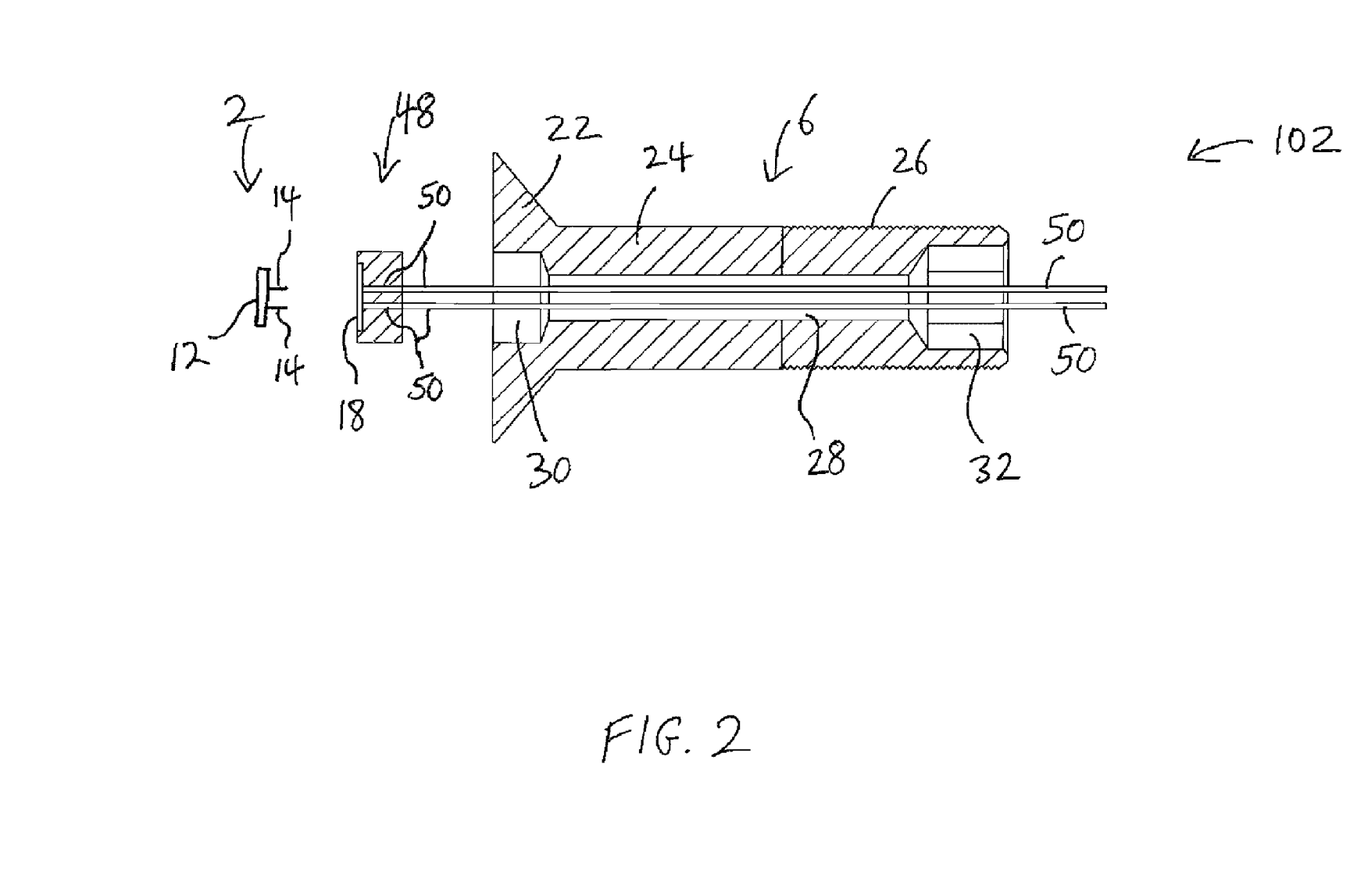
FIG. 2 is a schematic illustration of a further flow sensor and fastener assembly.

FIG. 2 is a schematic illustration of a further embodiment of a flow sensor and fastener assembly 102. The flow sensor and fastener assembly 102 comprises a flow sensor 2, a sensor housing 48, and a fastener element 6. In FIG. 2, for clarity these elements are shown separately, i.e. the flow sensor and fastener assembly 102 is shown in disassembled form.

In this embodiment the flow sensor 2 is a MEMS flow sensor. The flow sensor 2 comprises a sensing surface 12 and two connection pins 14 extending from the sensing surface 12.

The sensor housing 4 is formed of a solid structure having therein a recess 18 and two connection leads 50. In this embodiment the sensor housing 48 is circular shaped. The recess 18 is shaped for receiving and housing the flow sensor 2. The flow sensor 2 may be retained in the recess 18 by any appropriate method. For example the flow sensor 2 may be retained in the recess 18 by use of an adhesive, or by a push-fit.

The connection leads 50 are for receiving and providing electrical connection, for transmission of sensing signals, from the connection pins 14 of the flow sensor 2. The connection leads 50 pass through the sensor housing 48 from the recess 18 to the other side and then extend outwards, as flying leads or pins by a length that is sufficient to pass along the length of a bore 28 in the fastener element that will be described in more detail below. The extending part of the connection leads are preferably surrounded by insulating material in those embodiments where they are not sufficiently rigid that accidental contact with the inside of the bore 28 cannot be reasonably guaranteed. The sensor housing 4 may be made of electrically insulating material, in which case the parts of the connection leads 50 within the sensor housing 48 need not be individually insulated. Alternatively, if the sensor housing 4 is made of electrically conducting material, then the parts of the connection leads 50 within the sensor housing 48 are individually insulated.

The fastener element 6 comprises a head 22 and a shank 24, the shank 24 including an externally threaded part 26 (another possibility is for the whole length of the shank 24 to be externally threaded). To this extent, the fastener element 6 is the same as a conventional fastener, however the following modifications are included in the fastener element 6. The fastener element 6 comprises a bore 28 hollowed out along the centre of the whole length of the fastener element 6.

The bore 28 is shaped to receive and contain the sensor housing 48 at the head 22. More particularly, at the head 22 end of the fastener element 6 the bore is extended in diameter to provide a sensor housing receiving part 30 of the bore 28. The sensor housing receiving part 30 of the bore 28 is sized in accordance with the size of the sensor housing 48 to receive and retain the sensor housing 48. The sensor housing 48 may be retained in the sensor housing receiving part 30 of the bore 28 by any appropriate method. For example the sensor housing 48 may be retained in the sensor housing receiving part 30 of the bore 28 by use of an adhesive, or by a push-fit. When retained by push-fit, the sensor housing 48 (and hence in effect the flow sensor 2) can be conveniently replaced even when the flow sensor and fastener assembly 102 is fitted in a structure e.g. an aircraft wing. Another possibility for enabling convenient replacement of the sensor housing 48 when the flow sensor and fastener assembly 102 is fitted in a structure is to use a so-called de-bondable adhesive. A de-bondable adhesive is an adhesive that when heated to a certain temperature is triggered into a reaction that releases the adhesive effect. Further details of such adhesives are given in WO 2004/087826, the contents of which are incorporated herein by reference.

At the other end of the fastener element 6 the bore 28 is extended in width and shaped to provide a keyed receiving part 32 of the bore 28. In this embodiment the keyed receiving part 32 of the bore 28 is hexagonal shaped. The keyed receiving part 30 of the bore 28 is sized and shaped to receive a tool for rotating the flow sensor and fastener assembly 102 when fitting the flow sensor and fastener assembly 102 from the underside, thereby allowing the head 22 of the fastener element 6 to have a smooth surface and also allowing benefits of underside gripping and installation to be achieved.

In assembled form, the connection leads 50 extend from the end of the fastener element 6, thereby allowing the external electrical connections (not shown) to be connected to the connection leads 50, thereby completing electrical connection for transmission of sensing signals from the flow sensor 2. The ends of some or all of the connection channels may be provided with female sockets or male pin extensions or the like to facilitate contact.

Preferably, in order to allow alignment of the sensor with the direction of airflow during fitting, an alignment mark or other such feature may be included.

For completeness it is noted that thereby, in this embodiment, a modular transmission path is provided for the sensing signals, the modular transmission path comprising the connection pins 14 of the flow sensor 2 and the connection leads 50 of the sensor housing.

Figure 3:
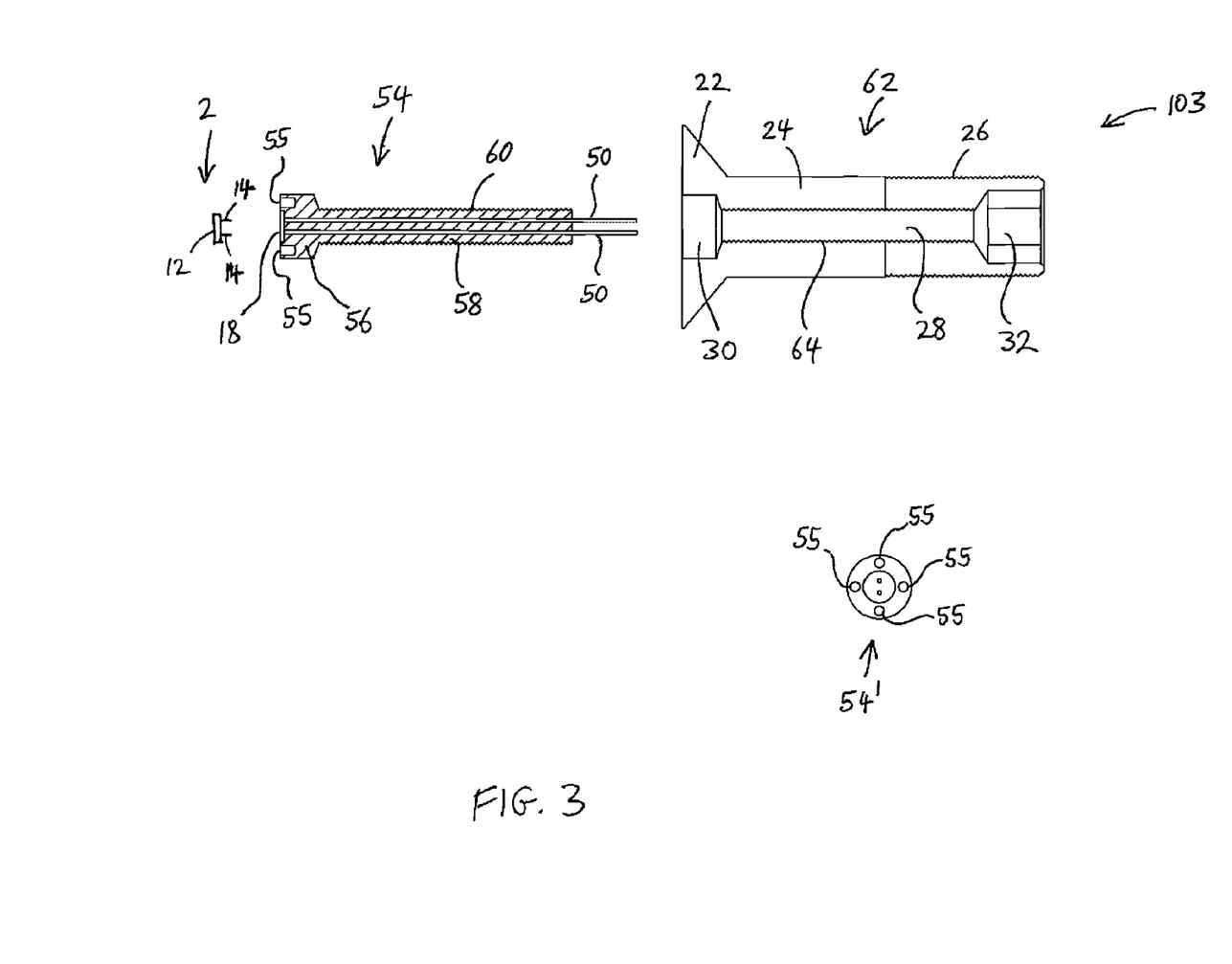
FIG. 3 is a schematic illustration of a further flow sensor and fastener assembly.

FIG. 3 is a schematic illustration of a further embodiment of a flow sensor and fastener assembly 103. The flow sensor and fastener assembly 103 comprises a flow sensor 2, an integrated sensor housing and contact insert 54, and a fastener element 62. In FIG. 3, for clarity these elements are shown separately, i.e. the flow sensor and fastener assembly 103 is shown in disassembled form. Also shown in FIG. 3 is an end view 54' of the integrated sensor housing and contact insert 54.

In this embodiment the flow sensor 2 is a MEMS flow sensor. The flow sensor 2 comprises a sensing surface 12 and two connection pins 14 extending from the sensing surface 12.

The integrated sensor housing and contact insert 54 is formed of a solid structure and comprises a sensor housing part 56 and a contact insert part 58 extending from the sensor housing part 56.

The sensor housing part 56 has therein a recess 18. In this embodiment the end view 54' of the integrated sensor housing and contact insert 54 is circular shaped. The recess 18 is shaped for receiving and housing the flow sensor 2. The flow sensor 2 may be retained in the recess 18 by any appropriate method. For example the flow sensor 2 may be retained in the recess 18 by use of an adhesive, or by a push-fit.

The sensor housing part 56 also contains in this embodiment four tool recesses 55. The tool recesses 55 are for enabling a four-pronged tool to be used to rotate the integrated sensor housing and contact insert for screw fitting git into a tapped surface 64 of a bore 28 of the fastener element 62 that will be described in more detail below.

The contact insert part 58 has a threaded outer surface 60 for screwing into the above mentioned tapped surface 64 of the bore 28 of the fastener element 62.

The integrated sensor housing and contact insert 54 also has two connection leads 50 that pass from the recess 18 through the sensor housing part 56 and the contact insert part 58 and then extend outwards, as flying leads or pins. The connection leads 50 are for receiving and providing electrical connection, for transmission of sensing signals, from the connection pins 14 of the flow sensor 2. The integrated sensor housing and contact insert 54 may be made of electrically insulating material, in which case the parts of the connection leads 50 need not be individually insulated. Alternatively, if the integrated sensor housing and contact insert 54 is made of electrically conducting material, then the parts of the connection leads 50 within the integrated sensor housing and contact insert 54 are individually insulated.

The fastener element 62 comprises a head 22 and a shank 24, the shank 24 including an externally threaded part 26 (another possibility is for the whole length of the shank 24 to be externally threaded). To this extent, the fastener element 6 is the same as a conventional fastener, however the following modifications are included in the fastener element 62. The fastener element 62 comprises a bore 28 hollowed out along the centre of the whole length of the fastener element 62.

The bore 28 is shaped, at the head 22, to receive and contain the sensor housing part 56 of the integrated sensor housing and contact insert 54. More particularly, at the head 22 end of the fastener element 62 the bore is extended in diameter to provide a sensor housing receiving part 30 of the bore 28. The sensor housing receiving part 30 of the bore 28 is sized in accordance with the size of the sensor housing part 56 to receive and retain the sensor housing part 56.

At the other end of the fastener element 62 the bore 28 is extended in width and shaped to provide a keyed receiving part 32 of the bore 28. In this embodiment the keyed receiving part 32 of the bore 28 is hexagonal shaped. The keyed receiving part 30 of the bore 28 is sized and shaped to receive a tool for rotating the flow sensor and fastener assembly 102 when fitting the flow sensor and fastener assembly 102 from the underside, thereby allowing the head 22 of the fastener element 62 to have a smooth surface and also allowing benefits of underside gripping and installation to be achieved.

The remaining central extent of the bore 28 is sized in accordance with the size of the above described contact insert part 58 of the integrated sensor housing and contact insert 54. This central extent of the bore 28 has a tapped surface 64, the tapped thread matching the threaded surface 60 of the contact insert part 58 of the integrated sensor housing and contact insert 54. By screwing the integrated sensor housing and contact insert 54 into the fastener element 62 the integrated sensor housing and contact insert 54 is located and retained in the fastener element 62, thereby locating and retaining the sensor housing part 56 of the integrated sensor housing and contact insert 54 in the sensor housing receiving part 30 of the fastener element 62.

One function of the integrated sensor housing and contact insert 54 is to act as a transmission conduit for the sensor signals, by virtue of the connection channels, as described above.

Another possible function of the integrated sensor housing and contact insert 54 is to allow convenient replacement thereof even when the flow sensor and fastener assembly 103 is fitted in a structure e.g. an aircraft wing.

Another possible function of the integrated sensor housing and contact insert 54 is to provide additional mechanical strength to the flow sensor and fastener assembly 103, in effect at least partially replacing any lost strength due to the presence of the bore 28, hence contributing to the capability of the flow sensor and fastener assembly 103 to function as a normal fastener for fixing two structures together as well as providing a way to fit the sensor. The integrated sensor housing and contact insert 54 may be made of stronger material than a conventional fastener. Preferably the assembly is sufficiently strengthened by the integrated sensor housing and contact insert 54 such that the fastener can be used for its fastening role without structural compromise, e.g. without compromising the specified load carrying capability of the fastener, compared to a conventional fastener of the same external dimensions; this may tend to provide an advantage of reducing or removing the need for re-design or re-certification of an existing structure to which the assembly was being fitted or retro-fitted.

Also, adhesive may be used with the threaded surface 60 so that the threaded fitting does not have to be fully torqued to provide rotational fixation.

Preferably, in order to allow alignment of the sensor with the direction of airflow during fitting, an alignment mark or other such feature may be included.

For completeness it is noted that, in this embodiment, a modular transmission path is provided for the sensing signals, the modular transmission path comprising the connection pins 14 of the flow sensor 2 and the connection leads 50 of the integrated sensor housing and contact insert 54. The ends of the connection channels 50 may be provided with female sockets or male pin extensions or the like to facilitate contact.

Figure 4:
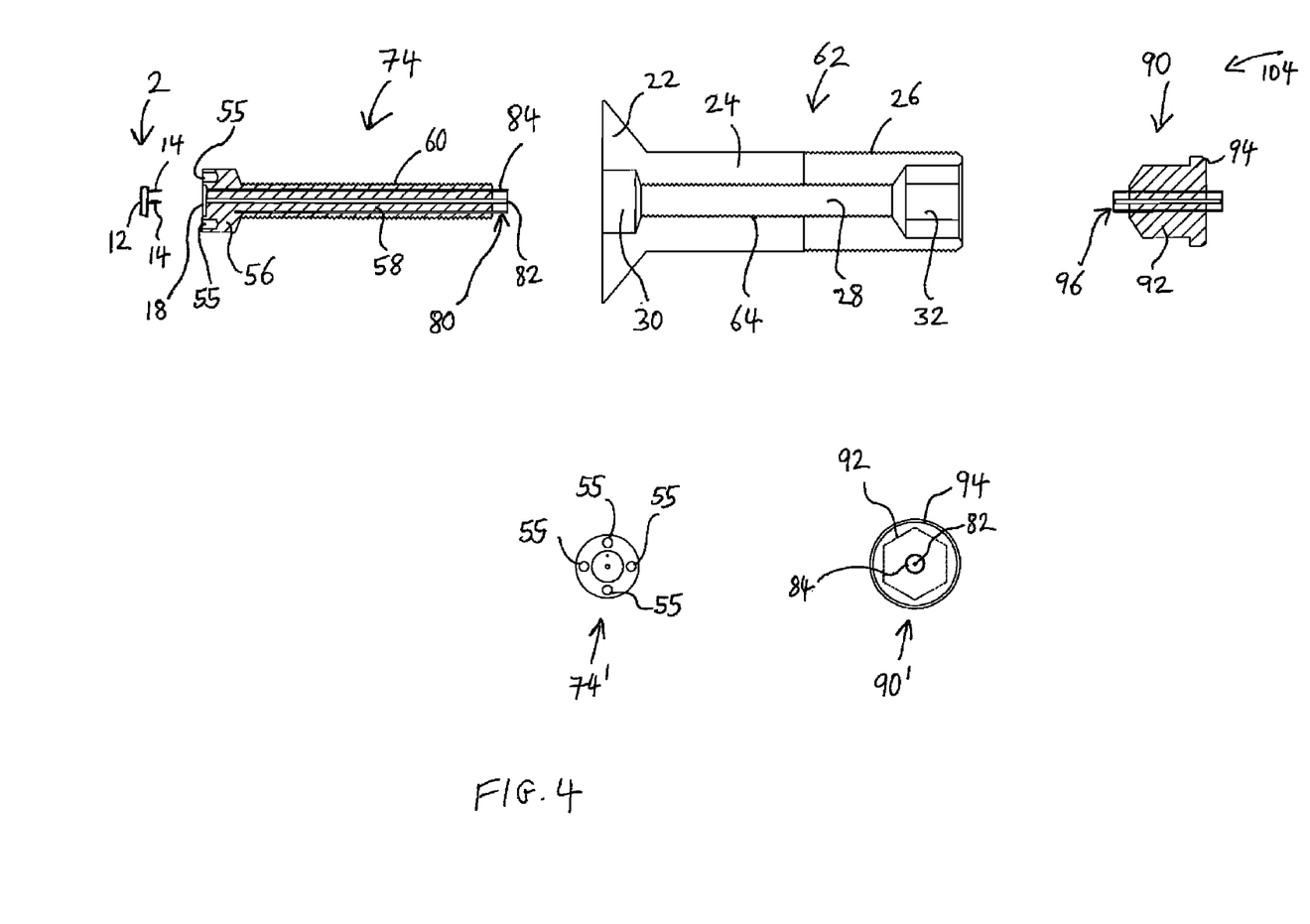
FIG. 4 is a schematic illustration of a further flow sensor and fastener assembly.

FIG. 4 is a schematic illustration of a further embodiment of a flow sensor and fastener assembly 104. The flow sensor and fastener assembly 104 comprises a flow sensor 2, an integrated sensor housing and contact insert 74, a fastener element 62, and a connection insert 90. In FIG. 4, for clarity these elements are shown separately, i.e. the flow sensor and fastener assembly 104 is shown in disassembled form. Also shown in FIG. 4 is an end view 74' of the integrated sensor housing and contact insert 74, and an end view 90' of the connection insert 90.

In this embodiment the flow sensor 2 is a MEMS flow sensor. The flow sensor 2 comprises a sensing surface 12 and two connection pins 14 extending from the sensing surface 12.

The integrated sensor housing and contact insert 74 is formed of a solid structure and comprises a sensor housing part 56 and a contact insert part 58 extending from the sensor housing part 56.

The sensor housing part 56 has therein a recess 18. In this embodiment the end view 74' of the integrated sensor housing and contact insert 74 is circular shaped. The recess 18 is shaped for receiving and housing the flow sensor 2. The flow sensor 2 may be retained in the recess 18 by any appropriate method. For example the flow sensor 2 may be retained in the recess 18 by use of an adhesive, or by a push-fit.

The sensor housing part 56 also contains in this embodiment four tool recesses 55. The tool recesses 55 are for enabling a four-pronged tool to be used to rotate the integrated sensor housing and contact insert for screw fitting git into a tapped surface 64 of a bore 28 of the fastener element 62 that will be described in more detail below.

The contact insert part 58 has a threaded outer surface 60 for screwing into the above mentioned tapped surface 64 of the bore 28 of the fastener element 62.

The integrated sensor housing and contact insert 74 also has a coaxial connection assembly 80 that passes from the recess 18 through the sensor housing part 56 and the contact insert part 58 and then extends outwards beyond the contact insert part 58. The coaxial connection assembly 80 comprises two coaxially arranged connection leads, one in the form of an outer connection ring 84, and the other in the form of an inner connection pin 82. The coaxial connection assembly 80 is for receiving and providing electrical connection, for transmission of sensing signals, from the connection pins 14 of the flow sensor 2.

The fastener element 62 comprises a head 22 and a shank 24, the shank 24 including an externally threaded part 26 (another possibility is for the whole length of the shank 24 to be externally threaded). To this extent, the fastener element 6 is the same as a conventional fastener, however the following modifications are included in the fastener element 62. The fastener element 62 comprises a bore 28 hollowed out along the centre of the whole length of the fastener element 62.

The bore 28 is shaped, at the head 22, to receive and contain the sensor housing part 56 of the integrated sensor housing and contact insert 74. More particularly, at the head 22 end of the fastener element 62 the bore is extended in diameter to provide a sensor housing receiving part 30 of the bore 28. The sensor housing receiving part 30 of the bore 28 is sized in accordance with the size of the sensor housing part 56 to receive and retain the sensor housing part 56.

At the other end of the fastener element 62 the bore 28 is extended in width and shaped to provide a keyed receiving part 32 of the bore 28. In this embodiment the keyed receiving part 32 of the bore 28 is hexagonal shaped. The keyed receiving part 30 of the bore 28 is sized and shaped in accordance with the size and shape of a keyed part 92 of the connection insert 90 (which will be explained in more detail below).

The remaining central extent of the bore 28 is sized in accordance with the size of the above described contact insert part 58 of the integrated sensor housing and contact insert 74. This central extent of the bore 28 has a tapped surface 64, the tapped thread matching the threaded surface 60 of the contact insert part 58 of the integrated sensor housing and contact insert 74. By screwing the integrated sensor housing and contact insert 74 into the fastener element 62 the integrated sensor housing and contact insert 74 is located and retained in the fastener element 62, thereby locating and retaining the sensor housing part 56 of the integrated sensor housing and contact insert 74 in the sensor housing receiving part 30 of the fastener element 62.

One function of the integrated sensor housing and contact insert 74 is to act as a transmission conduit for the sensor signals, by virtue of the connection channels, as described above.

Another possible function of the integrated sensor housing and contact insert 74 is to allow convenient replacement thereof even when the flow sensor and fastener assembly 104 is fitted in a structure e.g. an aircraft wing.

Another possible function of the integrated sensor housing and contact insert 74 is to provide additional mechanical strength to the flow sensor and fastener assembly 104, in effect at least partially replacing any lost strength due to the presence of the bore 28, hence contributing to the capability of the flow sensor and fastener assembly 104 to function as a normal fastener for fixing two structures together as well as providing a way to fit the sensor. The integrated sensor housing and contact insert 74 may be made of stronger material than a conventional fastener. Preferably the assembly is sufficiently strengthened by the integrated sensor housing and contact insert 74 such that the fastener can be used for its fastening role without structural compromise, e.g. without compromising the specified load carrying capability of the fastener, compared to a conventional fastener of the same external dimensions; this may tend to provide an advantage of reducing or removing the need for re-design or re-certification of an existing structure to which the assembly was being fitted or retro-fitted.

The connection insert 90 is formed of a solid structure comprising a keyed part 94, with a shoulder 94. In this embodiment the keyed part 34 is hexagonal shaped to fit with the keyed receiving part 32 of the bore 28 of the fastener element 62. The shoulder 36 is of circular outer diameter. In FIG. 4 the end view 90' of the connection insert 90 shows the inner connection pin 82, the outer connection ring 84, the hexagonal shape of the keyed part 34, and the circular outer diameter form of the shoulder 36.

The solid structure of the connection insert 90 has therein a coaxial connector 96 extending the whole length of the contact insert. The coaxial connector 96 is for providing electrical connection to the coaxial connection assembly 80 of the integrated sensor housing and contact insert 74, for transmission of sensing signals to external connections to be made (not shown).

The connection insert 90 may be retained in the keyed receiving part 32 of the bore 28 by any appropriate method. For example the connection insert 90 may be retained in the keyed receiving part 32 of the bore 28 by use of an adhesive, or by a push-fit.

One function of the connection insert 90 is to act as a transmission conduit for the sensor signals, by virtue of the coaxial connector 96, as described above.

Another possible function of the connection insert 90 is to provide additional mechanical strength to the flow sensor and fastener assembly 104, in effect at least partially replacing any lost strength due to the presence of the keyed receiving part of the bore 28, hence contributing to the capability of the flow sensor and fastener assembly 104 to function as a normal fastener for fixing two structures together as well as providing a way to fit the sensor. The connection insert 90 may be made of stronger material than a conventional fastener. Preferably the assembly is sufficiently strengthened by the integrated sensor housing and contact insert 90 (or in combination with the integrated sensor housing and contact insert 74) such that the fastener can be used for its fastening role without structural compromise, e.g. without compromising the specified load carrying capability of the fastener, compared to a conventional fastener of the same external dimensions; this may tend to provide an advantage of reducing or removing the need for re-design or re-certification of an existing structure to which the assembly was being fitted or retro-fitted.

An advantage of the use of the coaxial arrangement in this embodiment is that no specific orientation alignment is required for electrical connection purposes between the sensor 2, the integrated sensor housing and contact insert 74, and the fastener element 62. Also, adhesive may be used with the threaded surface 60 so that the threaded fitting does not have to be fully torqued to provide rotational fixation.

Preferably, in order to allow alignment of the sensor with the direction of airflow during fitting, an alignment mark or other such feature may be included.

For completeness it is noted that, in this embodiment, a modular transmission path is provided for the sensing signals, the modular transmission path comprising the connection pins 14 of the flow sensor 2, the coaxial connection assembly 80 of the integrated sensor housing and contact insert 74, and the coaxial connector 96 of the connection insert 90.

Referring again to FIG. 4, in a further embodiment of a flow sensor and fastener assembly, the connection insert may be omitted, and instead the end of the coaxial connection assembly 80 of the integrated sensor housing and contact insert is adapted to be connected directly, in a flying lead manner, to external connections (not shown). The end of the inner connection pin 82 and/or the end of the outer connection ring 84 may be provided with female sockets or male pin extensions or the like to facilitate contact.

In a further embodiment, a connection insert along the lines of that shown in FIG. 4 may be included in a flow sensor and fastener assembly of the type described above with reference to FIG. 3. In this case, the connection insert would comprise two connection leads, rather than a coaxial arrangement, for connecting to the connection leads 50 of the integrated sensor housing and contact insert 54 of FIG. 3.

More generally, in all of the above embodiments, a coaxial arrangement, rather than two parallel connection leads or channels, may be used.

In the above embodiments, the keyed shape of the various keyed elements is hexagonal. However, in other embodiments, other keyed shapes may be employed, for example triangular, square, custom-designed non-uniform shapes, and so on.

In the above embodiments, the sensor is a MEMS flow sensor. However, in further embodiments other types of flow sensors may be used. Furthermore, on yet further embodiments, other flow-type sensors, as opposed to sensors that literally measure flow, may be used. This includes, for example, temperature sensors and/or humidity sensors whose fundamental measurement is based on the rate and temperature at which air flows across the sensor.

It will be appreciated that in addition to the embodiments of flow sensor and fastener assemblies described above, in which the flow sensor itself is included, other embodiments of the invention are provided by the remainder of the assembly but without the sensor itself actually fitted.

It will further be appreciated that in addition to the embodiments of overall flow sensor and fastener assemblies described above, other embodiments of the invention are provided by elements or modules of such assemblies within their own right. For example, the above described fastener elements 6, 62 each represent embodiments in their own right.

Thus flow sensor and fastener assemblies of the above described embodiments tend to provide one or more of the following advantages.

The flow sensor and fastener assembly locates the flow sensor at the surface of the structure to which the assembly is being fixed.

The flow sensor and fastener assembly can be provided with sufficient strength to enable it to serve a fastening role at the same time as locating the sensor. For example, inserts in the bore of the fastener element can provide additional strength that in effect replaces all or at least some of the strength that might otherwise be lost by the presence of the bore.

The flow sensor and fastener assembly can be used in existing fastener locations on a structure, thereby avoiding or reducing the need for additional surface penetrations.

The flow sensor and fastener assembly may be provided in the same dimensions or shape as conventional fasteners used in conventional fastening mode on the structures, e.g. an aircraft wing, on which the flow sensor is to be fitted. This will tend to provide a first advantage that in e.g. a new structure, the integrated flow sensor/fasteners can conveniently be fitted at the same time, and with common tools and procedures, as other conventional fasteners being used to fasten the structure. This will tend to provide a second advantage that in e.g. a structure where fasteners are already present and thereafter a flow sensor is to be installed, that one of the existing fasteners can be removed and be replaced by the integrated sensor/fastener, thereby giving a simple procedure for the fitting of the flow sensor.

Preferably the flow sensor and fastener assembly is sufficiently strong for the fastener to be used for its fastening role without structural compromise, e.g. without compromising the specified load carrying capability of the fastener, compared to a conventional fastener of the same external dimensions; this may tend to provide an advantage of reducing or removing the need for re-design or re-certification of an existing structure to which the flow sensor and fastener assembly is to be fitted or retro-fitted.

Due to the modular form, the flow sensor can be readily replaced without removing the fastener element from its location, by removing the sensor housing from the fastener element.

The invention claimed is:

1. A surface flow sensor and fastener assembly, comprising at least the following modules: a sensor housing and a separate fastener element, wherein the sensor housing is adapted to receive a surface flow-based sensor and includes connection means for transmitting sensing signals from a fitted flow-based sensor; and wherein:
   the fastener element comprises a head, a shank, at least part of the shank being externally threaded, and a bore extending through a whole length of the fastener element, the bore being shaped at a head end of the fastener element to provide a sensor housing receiving part, being configured to locate a sensing surface of the flow-based sensor flush with a surface of the head of the fastener across which flow is to be measured, and being further configured to receive means for transmitting the sensing signals from the surface flow based sensor to a shank end of the fastener; and
   wherein the sensor housing is replaceable in the fastener element while the fastener is fastened in position to a structure.

2. A surface flow sensor and fastener assembly according to claim 1, wherein the bore is shaped at another end of the fastener element to provide a keyed receiving part of the bore.

3. A surface flow sensor and fastener assembly according to claim 2, wherein the keyed receiving part of the bore is hexagonal.

4. A surface flow sensor and fastener assembly according to claim 1, further comprising a surface flow-based sensor in the sensor housing.

5. A surface flow sensor and fastener assembly according to claim 1, wherein the sensor housing is replaceable in the fastener element by virtue of being push-fitted into the sensor housing receiving part.

6. A surface flow sensor and fastener assembly according to claim 1, wherein the sensor housing is replaceable in the fastener element by virtue of being adhered in the sensor housing receiving part by a de-bondable adhesive.

7. A surface flow sensor and fastener assembly according to claim 1, wherein the assembly further comprises an insert and a retaining nut;
   the retaining nut being for winding onto the external thread of the fastener element for holding the insert inside the bore of the fastener element; and
   the insert comprising connection means for transmitting the sensing signals from the connection means of the sensor housing to another end of the fastener.

8. A surface flow sensor and fastener assembly according to claim 1, wherein the connection means of the sensor housing pass through and extend beyond the bore of the fastener element.

9. A surface flow sensor and fastener assembly according to claim 1, wherein the sensor housing is replaceable in the fastener element by virtue of the sensor housing further comprising an extending part that is externally threaded for being screwed into the bore of the fastener element, the bore of the fastener element having a tapped surface matching the external threading of the extending part of the sensor housing.

10. A surface flow sensor and fastener assembly according to claim 9, wherein the assembly further comprises:
    a keyed insert for fitting into a keyed receiving part of the bore of the fastener element, the keyed insert comprising connection means for transmitting the signals from the connection means of the sensor housing.

11. A surface flow sensor and fastener assembly according to claim 1, wherein the connection means are formed as a coaxial arrangement.

12. A surface flow sensor and fastener assembly according to claim 1, wherein the flow-based sensor is a MEMS airflow sensor.

13. A surface flow sensor and fastener assembly according to claim 1 comprising a plurality of modules, the modules providing a modular transmission path for transmitting sensing signals from the flow sensor.

14. A surface flow sensor and fastener assembly according to claim 1, comprising:
    at least one surface flow-based sensor.

15. A surface flow sensor and fastener assembly according to claim 14, wherein the surface flow sensor and fastener assembly and the at least one surface flow-based sensor is part of an aircraft.

16. A surface flow sensor and fastener assembly according to claim 15, wherein the part of the aircraft is an aircraft wing.

* * * * *